United States Patent

Desieno

[11] Patent Number: 5,371,809
[45] Date of Patent: Dec. 6, 1994

[54] NEURAL NETWORK FOR IMPROVED CLASSIFICATON OF PATTERNS WHICH ADDS A BEST PERFORMING TRIAL BRANCH NODE TO THE NETWORK

[76] Inventor: Duane D. Desieno, 2015 Olite Ct., La Jolla, Calif. 92037

[21] Appl. No.: 859,828

[22] Filed: Mar. 30, 1992

[51] Int. Cl.$^5$ .............................................. G06K 9/62
[52] U.S. Cl. ...................................... 382/15; 395/23; 395/24
[58] Field of Search ...................... 382/14, 15; 395/21, 395/22, 23, 24, 25, 75

[56] References Cited

U.S. PATENT DOCUMENTS

| | | | |
|---|---|---|---|
| 4,760,604 | 7/1988 | Cooper et al. | 382/15 |
| 4,761,746 | 8/1988 | Tano et al. | 382/15 |
| 4,802,103 | 1/1989 | Faggin et al. | 364/513 |
| 4,805,225 | 2/1989 | Clark | 382/15 |
| 4,807,168 | 2/1989 | Moopenn et al. | 364/602 |
| 5,033,006 | 7/1991 | Ishizuka et al. | 364/513 |
| 5,048,097 | 9/1991 | Gaborski et al. | 382/14 |
| 5,052,043 | 9/1991 | Gaborski | 382/14 |
| 5,054,094 | 10/1991 | Barski | 382/18 |
| 5,218,646 | 7/1993 | Sirat et al. | 382/14 |
| 5,220,618 | 6/1993 | Sirat et al. | 382/14 |

OTHER PUBLICATIONS

Hirose et al., "Back Propagation Algorithm Which Varies the Number of Hidden Units", IEEE Trans. on Neural Networks, vol. 4, No. 1 pp. 61–66 (1991).
Karnin, "A Simple Procedure for Pruning Back-Propagation Trained Neural Networks", IEEE Trans on Neural Nets, vol. 1, No. 2 pp. 240–242 (Jun. 1990).
Quinlan, "Simplifying Decision Trees", Int. J Man–Machine Studies (1987) vol. 27, pp. 221–234.
Sethi et al., "Efficient Decision Tree Design . . . " Pattern Recognition vol. 9, pp. 197–206 (1977).
"Pattern Classification Using Neural Networks", Richard P. Lippmann, *IEEE Communications Magazine*, Nov. 1989, pp. 47–50, 59–63.
"Quadratic Function Nodes: Use, Structure and Training", Dennis J. Volper et al., *Neural Networks*, vol. 3, 1990, pp. 93–107.
"Optimal Partitioning for Classification and Regression Trees", Philip A. Chou, *IEEE Transactions on Pattern Analysis and Machine Intelligence*, vol. 13, No. 4, Apr., 1991, pp. 340–354.
"Fast Training Algorithms, for Multilayer Neural Nets", Richard P. Brent, *IEEE Transactions on Neural Networks*, vol. 2, No. 3, May, 1991, pp. 346–353.
"Entropy Nets: From Decision Trees to Neural Networks", Ishwar K. Sethi, *Proceedings of the IEEE*, vol. 78, No. 10, Oct., 1990, pp. 1605–1613.

*Primary Examiner*—David K. Moore
*Assistant Examiner*—Michael Cammarata
*Attorney, Agent, or Firm*—Brown, Martin, Haller & McClain

[57] ABSTRACT

Each processing element has a number of weights for each input connection. These weights are coefficients of a polynomial equation. The use of quadratic nodes permits discrimination between body pixel and edge pixels, in which an intermediate value is present, using a grey scale image. In the training method of the present invention, the middle layer is initially one leaf node which is connected to each output node. The contribution of each leaf node to the total output error is determined and the weights of the inputs to the leaf nodes are adjusted to minimize the error. The leaf node that has the best chance of improving the total output error is then "converted" into a branch node with two leaves. A branch node selected from a pool of trial branch nodes is used to replace the chosen leaf node. The trial branch nodes are then trained by gradient training to optimize the branch error function. From the set of trial branch nodes, the best performing node is selected and is substituted for the previously-selected leaf node. Two new leaf nodes are then created from the newly-substituted best-performing-branch node. A leaf node is accepted or rejected based upon the number of times it was activated related to the correctness of the classification. Once a leaf node is rejected, it is eliminated from any further operation, thereby minimizing the size of the network. Integer mathematics can be generated within the network so that a separate floating point coprocessor is not required.

17 Claims, 2 Drawing Sheets

NEURAL NETWORK FOR IMPROVED CLASSIFICATON OF PATTERNS WHICH ADDS A BEST PERFORMING TRIAL BRANCH NODE TO THE NETWORK

BACKGROUND OF THE INVENTION

Pattern classification using neural networks has found practical application in speech, vision, robotics and artificial intelligence where realtime response with real-world data is required. Currently, optical character recognition (OCR) is an area of interest for application of artificial intelligence and neural networks.

The use of a neural network usually involves two distinct procedures: initialization and training using data with known outputs, followed by recognition of actual unknown patterns. The network is first initialized by setting weights of the neural network elements to random values within certain ranges. The network is then successively presented with training patterns and the output is monitored for deviations from known desired output. In a typical neural network, every element must execute its function in order to get an output. The weights of the elements are then adjusted in a direction and by an amount that minimizes the total network error for the particular training pattern. Such a system is commonly known as a back propagation network.

A back propagation network has a hierarchical structure consisting of a minimum of three layers: an input layer, an output layer and a middle, or hidden, layer. The hidden layer usually consists of a number of individual layers with each layer fully connected to the following layer. The source of an error in the output layer is difficult to determine in a back propagation network. The error could be present if the output element itself has an incorrect weight, the inputs from the middle layer to the output layer are incorrect, or the output layer's weights and the inputs from the middle layer are incorrect. In order to distinguish between the three layers, many iterations, often hundreds or even thousands, may be required for the network to learn a set of input patterns. This may be acceptable for applications which do not require real time response, but in applications such as optical character recognition or speech recognition, real time response is a necessity. In addition, back propagation networks require so many elements that they are not practical for implementation on personal computers.

One alternative to back propagation classifiers is decision tree classifiers. Decision tree classifiers are hyperplane classifiers which require little computation for classification, and little memory, and have been used in many pattern classification applications. The size of the decision tree classifiers can be easily adjusted to match their complexity to the amount of training data provided. Training procedures gradually but rapidly build, or grow, trees. Thus, the time required for training the tree classifier is significantly reduced compared with that of a typical back propagation network. Decision trees, however, have been known to become very large, and the technology has tended away from trees.

SUMMARY OF THE INVENTION

It is an object of the present invention to provide a neural network in a decision tree form with feed forward classification for improved pattern classification procedures, including optical character recognition.

It is another advantage of the present invention to provide a classification network which is trained by application of quadratic input weights.

It is a further advantage of the present invention to provide a neural network with robust performance which is small enough that it can be used with personal computers.

In an exemplary embodiment, the neural network comprises an input layer, an output layer, and at least one middle layer containing a plurality of processing elements. Each processing element has a number of weights for each input connection, i.e., two or more weights. These weights are coefficients of a polynomial equation which takes a quadratic form, allowing the processing element to configure itself as either a hyperplane or a radial basis function to optimize classification according to a given task, i.e., to select the classification technique which provides better performance during training. The use of quadratic nodes permits discrimination between body pixel and edge pixels, in which an intermediate value is present, using a grey scale image. Thus, more detail is available to enhance classification capability.

In the training method of the present invention, the middle layer is initially one leaf node which is connected to each output node. Gradient training is performed on the output layer to minimize current output error function. The contribution of each leaf node to the total output error is determined and the weights of the inputs to the leaf nodes are adjusted to minimize the error. The leaf node that has the best chance of minimizing the total output error is identified and is then "converted" into a branch node with two leaves. This leaf node is selected based on statistical criteria described below in more detail. Using this method, a branch node selected from a pool of trial branch nodes is used to replace the chosen leaf node. Each trial branch node operates independently of the other trial branch nodes and starts with a different random value. The trial branch nodes are then trained by gradient training to optimize the branch error function. From the set of trial branch nodes, the best performing node is selected and is substituted for the previously-selected leaf node. Two new leaf nodes are then generated from the newly-substituted best-performing-branch node. The network output connection weights are duplicated from the original leaf node to the two new leaf nodes. The output is then compared to the desired output (classification) to determine if the training process is completed, i.e., the correct classification has been obtained. If the criteria is not met, the procedure is repeated, beginning with the gradient training of the output layer. In this way a decision tree is grown to meet the requirements of the given task.

The output node with the highest response determines the classification. The confidence in that classification is determined by examining which leaf node is active. Statistics on the count of training examples of each class which cause the leaf node to be active can be used to determine if the classification should be rejected. The goal of this analysis is to control the substitution performance, i.e., the number of errors, of the network. A leaf node is accepted or rejected based upon the number of times it was activated related to the correctness of the classification. Once a leaf node is rejected, it is eliminated from any further operation, thereby minimizing the size of the network.

The nodes of the trained network have the characteristics that 1) their outputs are binary for branch and leaf nodes; 2) their outputs can be linear for output nodes; and 3) calculations of branch node outputs depend only on the inputs. Characteristic number 3 is not true for other kinds of neural networks. It is these characteristics which facilitate the use of the inventive neural network with personal computers. Integer mathematics can be generated within the network so that a separate floating point coprocessor is not required, as would be the case for other neural network configurations. Since each processing element is treated independently their various weights can be quantized by rescaling the weight range for each element. This permits a straight transformation for each element.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
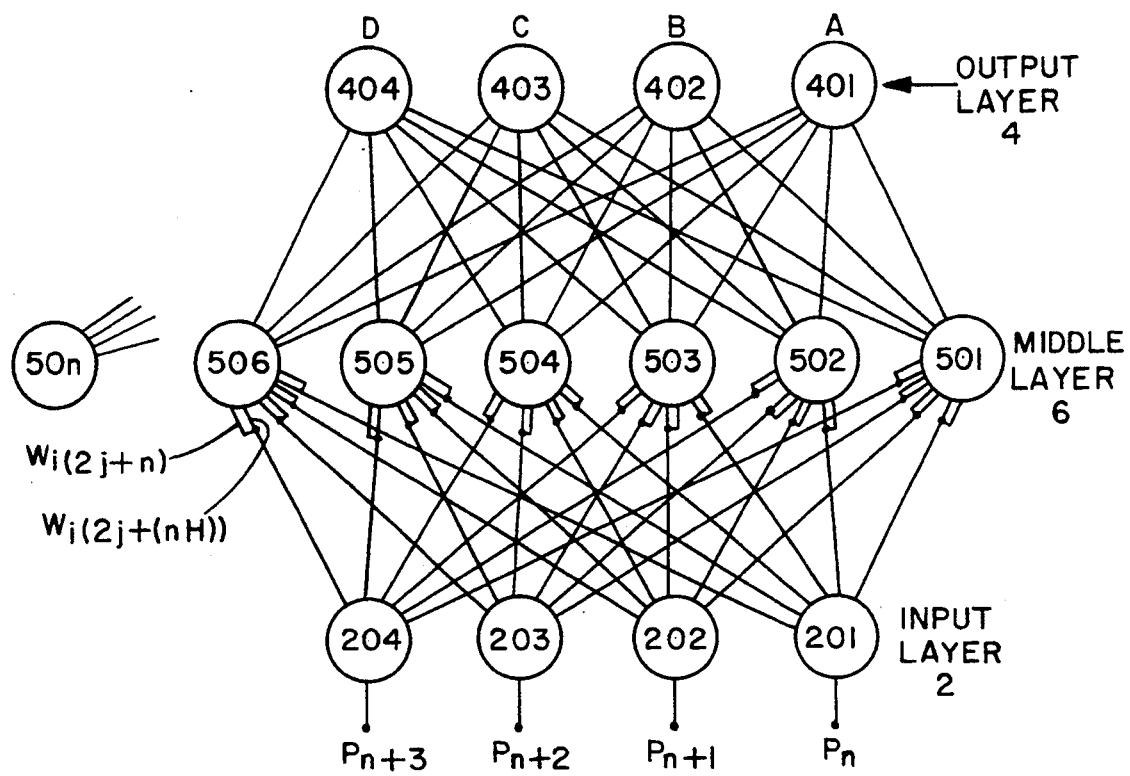
FIG. 1 is a diagrammatic view of the basic structure of a neural network (PRIOR ART)

As shown in FIG. 1, the basic structure of a neural network has an input layer 2, an output layer 4 and middle layer 6 which contains a number of processing nodes 501, 502, etc. Each of the input nodes 201, 202, etc. corresponds to an individual pixel $p_1$, $p_2$, $p_3$, etc. in an array of pixels. For explanation purposes, the individual pixels are part of a character image within an optical character recognition (OCR) system. Other input sources can be used, including but not limited to speech.

Each input node 201, 202, etc. passes along the signal of the particular pixel to which it is connected to each processing node within middle layer 6. Each of the processing nodes performs an arithmetic function using all of its inputs to generate an output. The outputs of all processing nodes within the middle layer 6 are connected to output nodes 401, 402, etc. in output layer 4. The number of output nodes 401, 402, etc. corresponds to the number of categories available in the classification. In an OCR system, each output node corresponds to one of the alphanumeric symbols which the neural network has been trained to recognize. For each character image received at the input layer 2, a number of scores corresponding to the number of output nodes 401, 402, etc. are generated at the output layer 4. The symbol associated with the output node which generated the highest score is identified as the character image which was received at the input.

Figure 2:
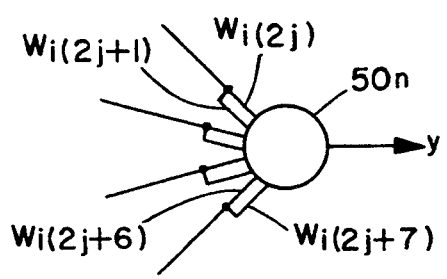
FIG. 2 is a diagrammatic view of a processing element with quadratic input weights.

For each input connection 301, 302, etc., two weights, $w_{i2j}$ and $w_{i(2j+1)}$, are assigned according to a quadratic function, as illustrated in FIG. 2. Quadratic function nodes are known in the art for their capability of categorization on continuously valued features in a similar way that linear nodes provide for binary features. Use of the quadratic function makes the present invention capable of performance analog as well as digital analyses. In the present invention, weights of the processing node inputs 301, 302, etc. are assigned according to the processing element quadratic equation:

$$t_i = w_{i(2j)} x_j + w_{i(2j+1)} x_j^2 \tag{1}$$

where $x_j$ is the input signal, $t_i$ is the target output value, $w_{i(2j)}$ is the weight of a first branch of the input and $W_{i(2j+1)}$ is the weight applied to a second branch of the same input, squared, for each processing element. The output for the processing element will be:

$$y = f\left( \sum_i t_i \right). \tag{2}$$

The use of quadratic input weights allows a blend of the hyperplane and radial basis function during network training so that the best partition method can be applied for different classification requirements.

The training method of the inventive neural network is substantially different from typical back-propagation and other training methods of the prior art. This unique and novel training method is faster than other methods and significantly reduces the requirement for reiterative adjustment of input weights for the all processing elements. Rejectable nodes or processing elements are rapidly identified during training and are thereafter not used so that only active nodes will require weight adjustments.

Figure 3:
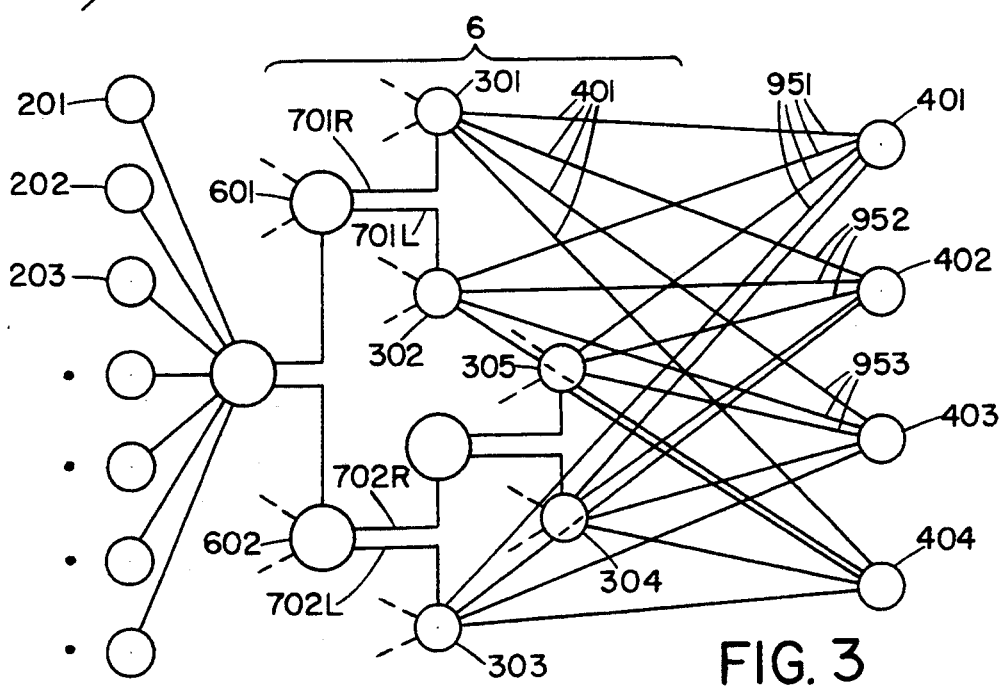
FIG. 3 is a diagrammatic view of the tree structure of the present invention.

The tree structure of the network of the present invention is illustrated in FIG. 3. The inputs of each processing node in middle layer 6, are the input modified image—the output of input nodes 201, 202, etc. Each processing element has a gating input to determine if the output of the processing element will be zero. If the output is to be zero, the node is not used, the input signal being cut off from the node by the gate.

Two types of processing elements are present in middle layer 6. These are branch nodes 601, 602, etc. and leaf nodes 301, 302, etc.

Branch processing nodes 601, 602, 603, etc. each have two outputs 701R, 701L, 702R, 702L, etc. which provide gating signals to two sub-trees emanating from branch nodes 601 and 602. The outputs of the branch nodes are binary, i.e., the gates are open or closed.

Leaf elements 301, 302, etc. each generate an output 901, 902, etc. consisting of a signal which assumes an analog value using a nonlinear sigmoid function of the net processing element quadratic function. Each output 901, 902, etc. is fed into each output element 401, 402, etc. An alternate form of leaf node is one in which the gating signal from the prior branch node is used to select a binary (0 or 1) output for the leaf node.

Output processing elements 401, 402 generate sigmoided or linear combinations of the signal from leaf node output 901, 902, etc. Only one leaf node will be active for a given output node. The weights on the inputs 951, 952, etc. of the output elements 401, 402, etc. can represent a confidence in the classification results, i.e., the higher the weight, the higher the confidence.

The structure of the branch nodes 601, 602, etc. need not be balanced, but can be an unbalanced tree with more nodes in one sub-tree than another. The ultimate network structure is determined by the stopping criteria and the choice of which leaf nodes are to be expanded during training.

The tree network structure herein described provides for easier training since the size of the training set decreases on each sub-tree. Thus, the trained network is capable of faster execution times, and full implementation provides for smaller networks.

The general method used for training a tree network according to the invention is as follows:

Starting with zero branch and leaf nodes, the current error function is calculated at the output nodes. A branch node is created from each leaf node, one at a time. For each chosen leaf node, a pool of branch nodes is trained to maximize the separations of classes at the branch, thereby minimizing the current error function for the training set. The new trial branch node which provided the greatest error reduction is selected and installed in place of the chosen node. These new leaf nodes, and their output connections, are then trained to reduce the output error. If overall accuracy has been achieved the training process stops; if not, current error function is calculated and the cycle is repeated.

In the preferred network training method according to the present invention, the starting point is zero branch nodes and one leaf node, the output of which is connected to the output processing element. Gradient training is initiated to minimize the current error output function. The gradient training can be gradient descent, "Quick-prop", or any other appropriate back propagation technique, as known in the art. (Quick-prop is a publicly available learning algorithm developed by Scott E. Fahlman in research under contracts with the NSF and (DOD) ARPA). The contribution of each leaf node to the total output error is determined and the input weight to the leafs are adjusted to minimize error using a supervised approach. The leaf node which has the greatest potential to decrease the output error is identified and will be replaced by a branch node as follows:

A pool of trial branch nodes is generated in which each trial branch node has data input from the input processing elements, and outputs connected to the output processing elements. Each trial branch node operates independently of other trial branch nodes in the pool but performs the same operation starting at a different random weight value.

The trial branch nodes are trained by a gradient training technique to optimize the branch error function. The branch error function can be determined by either error covariance, as is known in the art, or by Brent's criterion in which the following value is maximized:

$$\log\left(\frac{\pi_{k=1}^{k} m_{0,k}! m_{1,k}!}{\left(\sum_{k=1}^{k} m_{0,k}\right)! \left(\sum_{k=1}^{k} m_{1,k}\right)!}\right) \quad (3)$$

where $m_{i,k}$ is the number of training points of class k in $S_i$, one of the two possible sets into which the input is divided, and logarithms may be taken to a fixed positive base, e.g., 2. Brent's criterion is used to determine optimum splitting of a hyperplane into training sets. The derivation of this criterion is provided in "Fast Training Algorithms for Multilayer Neural Nets" by R. P. Brent, IEEE Trans. on Neur. Net. Vol. 2, No. 3, May 1991, p. 346.

The implemented trial branch node will be a threshold or gating element such that its activation must rise above a given level before it will produce a non-zero output. The trial branch nodes are trained using an arctan transfer function. When using Brent's criterion, Stirling's approximation to the $\Gamma$ function (asymptotic expansion) is used:

$$\frac{E(B)}{m} = -\sum_{k=1}^{k} P_k \log P_k + w\left(\frac{\log m}{m}\right), \text{ as } m \to \infty \text{ with } k \text{ fixed}, \quad (4)$$

where E(B) is the entropy associated with B (the branches of the trial branch node), and w is the work required, assuming discrete values for the m's in the criteria based on leaf node classification of input. The continuous approach suggested by Brent is not used. Instead, the nonlinear continuous approximation (sigmoid function) is used to provide a gradient rather than a threshold, thus allowing training of the binary result. The sigmoid function is not limited to an arctan function, but can be any non-linear continuous function.

From the pool of trial branch nodes, the best performing node is selected and is used to replace the leaf node which had been earlier identified as having the best chance of decreasing the total output error. The substituted trial branch node is converted into two new leaf nodes. The output connection weights for the two new leaf nodes are modified to minimize the output error.

The performance or size criteria is checked to determine the output error. If the criteria are met, the training process is complete. If not, the cycle is repeated beginning with performing gradient training on the output error. The criteria for accept/reject is described below.

The output node with the highest response determines the classification. The confidence in that classification can be determined by examining which leaf node was active during the operation. Statistics on the count of training examples of each class which cause the leaf node to be active are used to determine if the classification should be rejected. This analysis is intended to control the substitution performance of the network. The rules for determining whether a particular node should be rejected are as follows:

1) If the total number of training examples activating a given leaf node falls below 1/s, where s is the target substitution rate (error occurrence), the leaf node is placed in the reject category.

For example, a training set for OCR consists of 4,000 examples, 1,000 each of "A", "B", "C" and "D". For a desired substitution rate of 1%, the node in question must have been activated at least 100 times, which is independent of the number of training examples.

2) If the number of training examples activating a given leaf node where the classification is correct ($N_c$) is less than the number of training examples activating the same leaf node where the classification is incorrect ($N_S$) divided by the substitution rate s, the node is rejected ($N_c < N_S/S$).

Using the same example as above, if the node is activated five times where the wrong classification occurred, if the substitution rate is 1%, any fewer than 500 activations associated with a correct classification will result in the node being rejected.

3) If the scenarios in 1) and 2) above do not occur the node is accepted.

An exception to the rule in 2) is that a leaf node will still be acceptable for conversion into a branch node if it is activated enough times to exceed the criteria in rule 1). This branching is permitted because reject criteria can be determined later in the tree.

Figure 4:
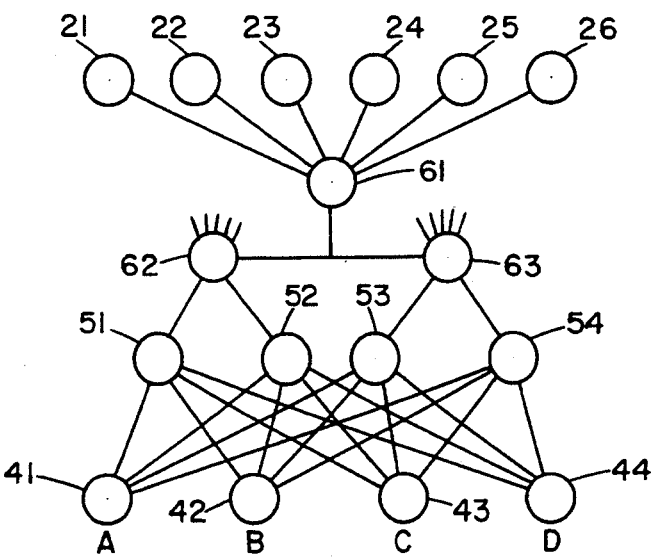
FIG. 4 is a diagrammatic view of a segment of a tree structure.

In an illustrative example, the neural network for OCR consists of six input image pixel connected to six input nodes 21 through 26, three branch nodes 61, 62 and 63, four leaf nodes 51, 52, 53 and 54, and four output nodes 41, 42, 43 and 44 and representing possible classifications "A", "B", "C" and "D", as shown in FIG. 4.

After introduction of the training examples and determination of the total output error, node 52 is identified as contributing the most to that error. Only a portion of the entire available network is required to provide the above combination of nodes. Elsewhere in the network, other nodes receive the same six inputs 21 through 26 but with different weights, and provide signals to the output nodes 41 through 44, with different output weights.

A pool of trial branch nodes $T_1$, $T_2$ and $T_3$, etc. is created from some of the available "extras". Each trial node is treated independently but functions the same as the leaf nodes. The only differences are the initial weights. During training, the accept/reject data are produced to identify which of the trial branch nodes $T_1$, $T_2$, $T_3$ . . . met the substitution rate criteria. The best branch node of the pool is selected, for example, $T_2$, and is substituted into the place of leaf node 52. The output weights of node 52' (formerly node $T_2$) are the same as those for the original leaf node 52.

For the training set of 4,000 examples used above, suppose that leaf node 52' is activated 900 times when there was an "A" input, 950 times when "B" was input and no times when "C" or "D" was input. Thus, leaf node 52' was activated 1,850 times, which exceeds the criteria for both rules 1) and 2). Having successfully passed that test, leaf node 52' is converted into branch node 52" with two leaf nodes: leaf 52R and 52L and the training data is applied to test leaves 52R and 52L. In the case of an ideal split, leaf 52R will be activated 900 times when the input is an "A" and 950 times when the input is a "B" for the same training set. If the ideal split does not occur, the input weights for leaves 52R and 52L are adjusted.

A more detailed example of the training statistics is provided in Table 1. In this example there are eight possible classifications that can occur. Elements 485 through 549 are identified in the listing of elements used in a training set of approximately 25,000 characters. In the second and third columns, a non-zero entry means that the element identified in the first column has branched to form two leaf nodes. It is apparent that multiple branchings have occurred from the original element. For example, element 488 had sufficient activations (2043) to be branched to leaf nodes 492 and 493. Node 492 passed the test for number of activations (4025) and branched again to nodes 498 and 496. While node 498 has sufficient activations, it does not meet the criteria $N_c > N_S/s$. Nonetheless, it branches to nodes 513 and 534. Node 513 fails both tests and branches into nodes 522 and 549 which are both rejected. Node 534 passes both criteria and thus will provide high confidence, with 1904 activations for category "5" and only 25 activations for non-"5" classifications.

TABLE 1

| LEAF NODE | BRANCH TO | | "0" | "1" | "2" | "3" | "4" | "5" | "6" | "7" | "8" | "9" |
|---|---|---|---|---|---|---|---|---|---|---|---|---|
| 485 | 487 | 486 | 3021 | 4173 | 2144 | 1935 | 2055 | 2109 | 1994 | 2092 | 2198 | 3337 |
| 486 | 491 | 488 | 2988 | 91 | 2030 | 1896 | 18 | 2033 | 1965 | 27 | 1940 | 40 |
| 487 | 501 | 489 | 33 | 4082 | 114 | 39 | 2037 | 76 | 29 | 2065 | 258 | 3297 |
| 488 | 492 | 493 | 37 | 58 | 1994 | 1895 | 2 | 2011 | 18 | 27 | 1903 | 39 |
| 489 | 495 | 490 | 14 | 21 | 112 | 34 | 2032 | 72 | 29 | 2061 | 196 | 3285 |
| 490 | 494 | 502 | 10 | 9 | 98 | 34 | 22 | 57 | 0 | 2055 | 169 | 3227 |
| 491 | 499 | 507 | 2951 | 33 | 36 | 1 | 16 | 22 | 1947 | 0 | 37 | 1 |
| 492 | 498 | 496 | 22 | 48 | 69 | 53 | 1 | 1936 | 15 | 3 | 1844 | 34 |
| 493 | 497 | 509 | 15 | 10 | 1925 | 1842 | 1 | 75 | 3 | 24 | 59 | 5 |
| 494 | 500 | 503 | 8 | 5 | 61 | 30 | 20 | 48 | 0 | 5615 | 6 | 3184 |
| 495 | 504 | 511 | 4 | 12 | 14 | 0 | 2010 | 15 | 29 | 6 | 27 | 58 |
| 496 | 514 | 505 | 13 | 42 | 16 | 24 | 1 | 16 | 10 | 1 | 1827 | 32 |
| 497 | 512 | 508 | 1 | 3 | 4 | 1838 | 0 | 71 | 1 | 22 | 48 | 4 |
| 498 | 513 | 534 | 9 | 6 | 53 | 29 | 0 | 1920 | 5 | 2 | 17 | 2 |
| 499 | 521 | 510 | 17 | 33 | 17 | 1 | 15 | 15 | 1936 | 0 | 24 | 0 |
| 500 | 506 | 519 | 3 | 2 | 59 | 27 | 10 | 38 | 0 | 20 | 140 | 17 |
| 501 | 520 | 518 | 19 | 4061 | 2 | 5 | 5 | 4 | 0 | 4 | 62 | 12 |
| 502 | 526 | 515 | 2 | 4 | 37 | 4 | 2 | 9 | 0 | 1999 | 13 | 43 |
| 503 | 517 | 539 | 5 | 3 | 2 | 3 | 10 | 10 | 0 | 36 | 16 | 3167 |
| 504 | 516 | 540 | 4 | 10 | 12 | 0 | 54 | 6 | 10 | 6 | 23 | 50 |
| 505 | 532 | 541 | 1 | 1 | 4 | 23 | 1 | 4 | 3 | 0 | 1810 | 32 |
| 506 | 525 | 542 | 0 | 1 | 0 | 0 | 10 | 38 | 0 | 2 | 138 | 17 |
| 507 | 527 | 543 | 2934 | 0 | 19 | 0 | 1 | 7 | 11 | 0 | 13 | 1 |
| 508 | 533 | 544 | 1 | 1 | 3 | 1811 | 0 | 4 | 0 | 22 | 13 | 3 |
| 509 | 529 | 545 | 14 | 7 | 1921 | 4 | 1 | 4 | 2 | 2 | 11 | 1 |
| 510 | 535 | 546 | 9 | 31 | 14 | 0 | 15 | 8 | 10 | 0 | 22 | 0 |
| 511 | 531 | 547 | 0 | 2 | 2 | 0 | 1956 | 9 | 19 | 0 | 4 | 8 |
| 512 | 524 | 548 | 0 | 2 | 1 | 27 | 0 | 67 | 1 | 0 | 35 | 1 |
| 513 | 522 | 549 | 9 | 5 | 53 | 15 | 0 | 16 | 2 | 1 | 13 | 0 |
| 514 | 528 | 550 | 12 | 41 | 12 | 1 | 0 | 12 | 7 | 1 | 17 | 0 |
| 515 | 538 | 551 | 0 | 4 | 17 | 4 | 0 | 1 | 0 | 1990 | 2 | 12 |
| 516 | 523 | 552 | 4 | 5 | 0 | 0 | 50 | 2 | 1 | 6 | 3 | 49 |
| 517 | 530 | 553 | 3 | 3 | 1 | 3 | 9 | 9 | 0 | 24 | 14 | 26 |
| 518 | 537 | 554 | 17 | 8 | 2 | 4 | 3 | 3 | 0 | 3 | 54 | 10 |
| 519 | 536 | 555 | 3 | 1 | 59 | 27 | 0 | 0 | 0 | 18 | 2 | 0 |

TABLE 1-continued

| LEAF NODE | BRANCH TO | "0" | "1" | "2" | "3" | "4" | "5" | "6" | "7" | "8" | "9" |
|---|---|---|---|---|---|---|---|---|---|---|---|
| 520 | 0 | 0 | 2 | 4053 | 0 | 1 | 2 | 1 | 0 | 1 | 8 | 2 |
| 521 | 0 | 0 | 8 | 2 | 3 | 1 | 0 | 7 | 1926 | 0 | 2 | 0 |
| 522 | 0 | 0 | 0 | 0 | 0 | 15 | 0 | 16 | 2 | 1 | 13 | 0 |
| 523 | 0 | 0 | 0 | 0 | 0 | 0 | 50 | 2 | 0 | 0 | 3 | 6 |
| 524 | 0 | 0 | 0 | 2 | 1 | 23 | 0 | 0 | 1 | 0 | 35 | 1 |
| 525 | 0 | 0 | 0 | 1 | 0 | 0 | 0 | 1 | 0 | 0 | 138 | 1 |
| 526 | 0 | 0 | 2 | 0 | 20 | 0 | 2 | 8 | 0 | 9 | 11 | 31 |
| 527 | 0 | 0 | 0 | 0 | 12 | 0 | 0 | 6 | 7 | 0 | 11 | 1 |
| 528 | 0 | 0 | 0 | 41 | 0 | 1 | 0 | 0 | 7 | 1 | 0 | 0 |
| 529 | 0 | 0 | 2 | 4 | 1920 | 0 | 1 | 0 | 0 | 0 | 3 | 0 |
| 530 | 0 | 0 | 3 | 3 | 0 | 1 | 0 | 0 | 0 | 0 | 13 | 26 |
| 531 | 0 | 0 | 0 | 2 | 2 | 0 | 1 | 5 | 19 | 0 | 1 | 6 |
| 532 | 0 | 0 | 1 | 0 | 2 | 0 | 0 | 3 | 2 | 0 | 1799 | 0 |
| 533 | 0 | 0 | 1 | 1 | 0 | 1806 | 0 | 1 | 0 | 3 | 0 | 0 |
| 534 | 0 | 0 | 0 | 1 | 0 | 14 | 0 | 1904 | 3 | 1 | 4 | 2 |
| 535 | 0 | 0 | 0 | 31 | 0 | 0 | 0 | 0 | 0 | 0 | 21 | 0 |
| 536 | 0 | 0 | 0 | 1 | 0 | 27 | 0 | 0 | 0 | 18 | 2 | 0 |
| 537 | 0 | 0 | 17 | 0 | 2 | 4 | 3 | 1 | 0 | 0 | 0 | 9 |
| 538 | 0 | 0 | 0 | 3 | 0 | 0 | 0 | 0 | 0 | 1988 | 0 | 0 |
| 539 | 0 | 0 | 2 | 0 | 1 | 0 | 1 | 1 | 0 | 12 | 2 | 3141 |
| 540 | 0 | 0 | 0 | 5 | 12 | 0 | 4 | 4 | 9 | 0 | 20 | 1 |
| 541 | 0 | 0 | 0 | 1 | 2 | 23 | 1 | 1 | 1 | 0 | 11 | 32 |
| 542 | 0 | 0 | 0 | 0 | 0 | 0 | 10 | 37 | 0 | 2 | 0 | 16 |
| 543 | 0 | 0 | 2934 | 0 | 7 | 0 | 1 | 1 | 4 | 0 | 2 | 0 |
| 544 | 0 | 0 | 0 | 0 | 3 | 5 | 0 | 3 | 0 | 19 | 13 | 3 |
| 545 | 0 | 0 | 12 | 3 | 1 | 4 | 0 | 4 | 2 | 2 | 8 | 1 |
| 546 | 0 | 0 | 9 | 0 | 14 | 0 | 15 | 8 | 10 | 0 | 1 | 0 |
| 547 | 0 | 0 | 0 | 0 | 0 | 0 | 1955 | 4 | 0 | 0 | 3 | 2 |
| 548 | 0 | 0 | 0 | 0 | 0 | 4 | 0 | 67 | 0 | 0 | 0 | 0 |
| 549 | 0 | 0 | 9 | 5 | 53 | 0 | 0 | 0 | 0 | 0 | 0 | 0 |

Through this breakdown, the number of nodes required in the tree for reliable classification is decreased from 70 to 11, as shown in Table 2 which identifies the best performing node for each classification.

TABLE 2

| NODE | CLASS | SUB. RATE | CORRECT CLASS. |
|---|---|---|---|
| 543 | "0" | 15 | 2934 |
| 520 | "1" | 17 | 4053 |
| 529 | "2" | 10 | 1920 |
| 533 | "3" | 6 | 1806 |
| 547 | "4" | 9 | 1955 |
| 534 | "5" | 25 | 1904 |
| 521 | "6" | 23 | 1926 |
| 538 | "7" | 3 | 1988 |
| 532 | "8" | 8 | 1799 |
| 539 | "9" | 19 | 3141 |

Figure 5:
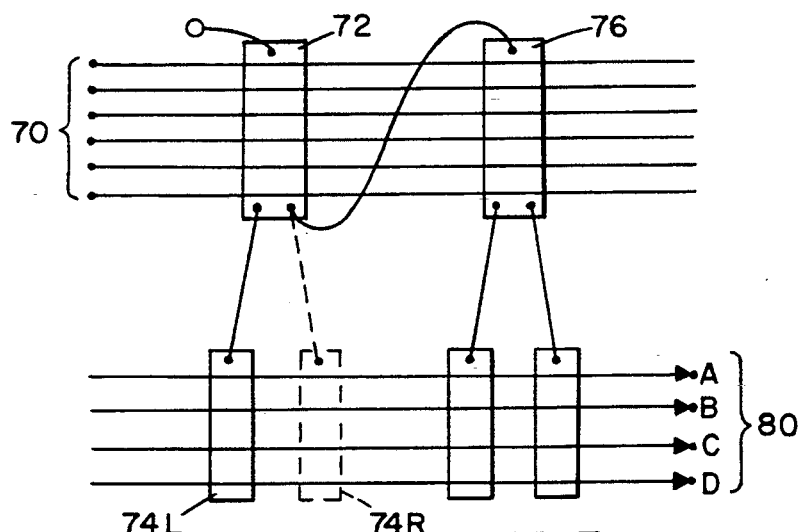
FIG. 5 is a diagrammatic view of an exemplary hardware illustration.

To provide a different perspective for illustration of the training and substitution, a hardware-type diagram is provided in FIG. 5, with branch decision modules providing the function of branch nodes, and leaf decision modules functioning as leaf nodes.

The input signals are provided to branch decision module 72 by network input bus 70 connected to six input pixels. Two leaf decision modules 74L and 74R receive their inputs from branch decision module 72 (as well as from all other branch decision modules). After a training set is run, it is determined that leaf decision module 74R has the greatest potential for minimizing the total output error as picked up by output bus 80 to provide classification signals "A", "B", "C" and "D". From elsewhere in the network, where a pool of trial branch decision modules has also been statistically tested, branch decision module 76 is selected as having the best performance. Branch decision module 76 is then connected at its input to the gate right signal output from branch decision module 72. This new branch decision module 76 has two leaf decision modules 78L and 78R which are connected to the output bus 80. The weighted signals provided by leaf decision nodes 74L, 78L and 78R are summed to produce the classification signals.

From this illustration it is apparent that the classification tree formed from the collection of branch and leaf nodes need not be balanced, and the number of branch and leaf nodes is varied as needed to minimize output error. This, however, does not end up in a perpetually growing tree. Instead, it limits the size of the network by eliminating a node once it has been rejected.

The nodes of the trained network have the following characteristics:
1) their outputs are binary for branch and leaf nodes;
2) their outputs can be linear for output nodes; and
3) calculation of branch node outputs depend only on the inputs.

The above characteristics make it possible to convert the floating weights of the branch nodes to integer values according to the relationships:

$$IW = \text{integer part of } (FW * M) \quad (5)$$
$$M = IR/FR \text{ and}$$
$$FR = 2 * \max(lw, -sw)$$

where
IW is the Integer weight;
FW is the floating point weight;
M is the weight multiplier;
FR is the floating point range (based on trained weights); and
IR is the integer range (based on implementation hardware);
lw is the largest weight, and
-sw is the smallest weight.

The floating point weights are converted to integer weights by using the above relationships where FR is calculated over all the weights in the layer. For better performance, the floating point weights are quantized during training based on the following:

$$FW = \frac{IW}{M} \qquad (6)$$

Figure 6A:
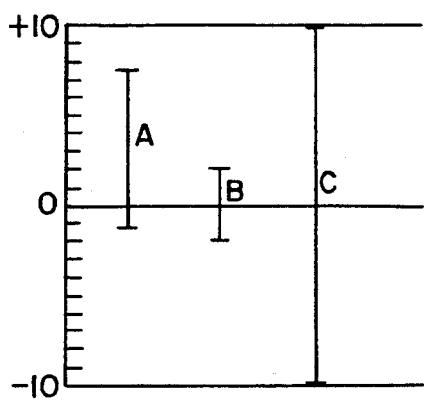
FIGS. 6a and 6b are plots of weight ranges for different processing elements.
Figure 6B:
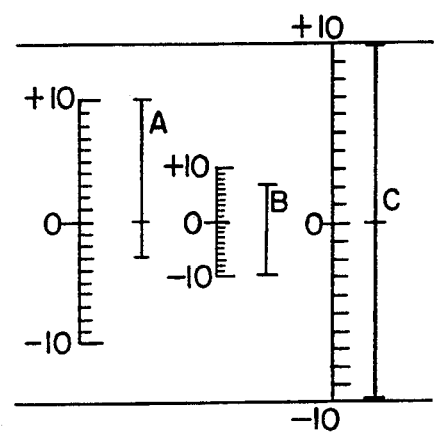

In the prior art, conversion from floating point weights to integer weights results in quantization error because the weights are quantized on integer boundaries. In the present invention, since each processing element is treated independently there is a straight transformation by rescaling the weight range for each processing element. For example, three processing elements A, B and C each have a different range of weights. In the prior art, each weight range would be held against the same scale ($-10$ to $+10$) to identify the appropriate integer boundary, as in FIG. 6a. In the present training method, shown in FIG. 6b, processing element and its corresponding weight range is looked at separately, with each weight range being divided by the same number of divisions (20) and centered on zero, where the size of each division is adjusted as needed to fit within the individual range.

The above training method may be further enhanced by one or more of the following procedures:

1) perform the gradient descent calculations using an accelerated method such as "quick prop";
2) incorporate a weight minimization function into the gradient calculation to provide more robust performance; unimportant inputs receive small weights due to weight minimization;
3) a subset of the total inputs can be used to determine a branch condition based upon a sensitivity analysis of each node. This makes the network smaller and allows each node to use a different subset of the total inputs. Each branch node can have a different set of inputs and, once its weight is determined to be very small or zero, it is not used.

Although the invention has been exemplified as an OCR system for recognizing and classifying normalized machine printed alphanumeric characters, the inventive neural network and training technique can be used to recognize and classify patterns that occur in a wide variety of systems, including any signal pattern produced by a group of input sensors or which occurs in a single or multi-bit data stream or in a group of analog signals.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A network for classification of a plurality of patterns in unknown input data comprising:
    a plurality of processing elements, including a plurality of leaf nodes, each for receiving an input signal from a plurality of input nodes and for providing a plurality of output values therefrom to a plurality of output nodes, each processing element having at least one input weight associated with each input signal;
    supervision means for comparison of each of said plurality of output values to a known classification for a corresponding training example input signal and for generation of an error signal;
    adjustment means for determining changes in each input weight in response to said error signal from said supervision means;
    identification means for selecting a leaf node of said plurality which has the greatest potential to decrease said error signal, said identification means including an accumulation means and a comparison means, said accumulation means for receiving and counting for each of said leaf nodes an activation value comprising the number of times a given leaf node is activated in response to a plurality of training example input signals and said comparison means for comparing said activation value to a first preselected statistical value to test for accept-/reject criteria; and
    a pool of trial branch nodes within said plurality of processing elements from which a best performing trial branch node is selected and used in place of said leaf node which has the greatest potential to decrease said error signal, said best performing trial branch node branching into two said leaf nodes connected to each of said plurality of output nodes;
    wherein said supervision means generates a continue training command when said plurality of output values fails to match said known classification and generates a stop training command when said plurality of output values matches said known classification.

2. A network as in claim 1 wherein each said processing element has a plurality of element inputs and an element output and provides an element output value according to a threshold function applied to said plurality of input signals.

3. A network as in claim 2 wherein said threshold function is a quadratic equation and each said processing element has two input weights.

4. A network as in claim 2 wherein each said processing element comprises:
    means, responsive to said supervision means, for multiplying each said input signal by a corresponding one of said at least one input weights to form weighted input signals;
    means, responsive to said weighted input signals for forming a sum of input signals; and
    means for thresholding said sum of input signals by a predetermined continuous threshold function to provide said output values.

5. A network as in claim 4 wherein a range of input weights for each said processing element has a quantized value substantially equal to said range for all other processing elements and each said processing element is treated independently from all other processing elements so that conversion of floating point weights to integer weights is facilitated by rescaling said range for each said processing element.

6. A network as in claim 1 wherein said comparison means includes means for comparing an error rate within said activation value against a correct rate within said activation value.

7. A network as in claim 1 wherein said unknown input data comprises a detected signal generated by a predefined number of pixels wherein a value of each of said pixels is applied to each of said processing elements.

8. A network as in claim 4 wherein said predetermined continuous function is a sigmoid function.

9. A network as in claim 1 wherein a combination of said supervision means and said adjustment means uses gradient descent.

10. A network as in claim 1 wherein a combination of said supervision means and said adjustment means is Quick-prop.

11. A method for training a network for classification of a plurality of patterns in unknown input data comprising:
   selecting a plurality of processing elements for receiving an input signal from a plurality of input nodes and for providing a plurality of output values to a plurality of output nodes with each processing element having at least one input weight associated with each input signal;
   performing gradient training on said plurality of output nodes to minimize output error;
   identifying a best leaf node within said plurality of processing elements which have the best chance of improving output error by accumulating the number of activations of each of said plurality of leaf nodes and comparing said number of activations to a preselected statistical value to test for compliance with an accept/reject criteria;
   selecting a trial branch node with the best performance from a pool of trial branch nodes which have been trained to minimize output error;
   substituting said trial branch node for said best leaf node; and
   creating two new leaf nodes from the outputs of said trial branch node and testing said two new leaf nodes.

12. A method as in claim 11 wherein the step of performing gradient training comprises using gradient descent.

13. A method as in claim 11 wherein the step of performing gradient training comprises using Quick-prop.

14. A method as in claim 11 wherein the step of identifying said worst leaf node includes rendering a leaf node of said plurality inactive for further processing if it fails to comply with said accept/reject criteria.

15. A method as in claim 11 wherein the step of selecting a plurality of processing elements includes selecting processing elements with two input weights associated with each signal.

16. A method as in claim 15 wherein the step of selecting processing elements with two input weights includes selecting processing elements wherein a quadratic threshold function is performed on said input signal.

17. A method as in claim 11 further comprising converting floating point weights for said input weights into integer weights for said input weights by rescaling a range of said input weights for each selected processing element independently from all other processing elements such that each said range has a quantized value substantially equal to said range for all other processing elements.

* * * * *